United States Patent
Olson et al.

(10) Patent No.: US 12,502,404 B1
(45) Date of Patent: Dec. 23, 2025

(54) CONDITIONAL MODULATION OF THERAPY USING RECOMBINANT CELLS

(71) Applicant: NantBio, Inc., Culver City, CA (US)

(72) Inventors: Clifford Anders Olson, Culver City, CA (US); Kayyan Niazi, Culver City, CA (US); Nicholas J. Witchey, Culver City, CA (US); Wael Tadros, Culver City, CA (US)

(73) Assignee: NantBio, Inc., Culver City, CA (US)

( * ) Notice: Subject to any disclaimer, the term of this patent is extended or adjusted under 35 U.S.C. 154(b) by 1189 days.

(21) Appl. No.: 16/818,477

(22) Filed: Mar. 13, 2020

Related U.S. Application Data

(60) Provisional application No. 62/819,113, filed on Mar. 15, 2019.

(51) Int. Cl.

| | | |
|---|---|---|
| *A61K 35/17* | (2025.01) | |
| *A61K 35/12* | (2015.01) | |
| *A61K 38/17* | (2006.01) | |
| *A61K 48/00* | (2006.01) | |
| *C12N 15/11* | (2006.01) | |
| *C12N 15/62* | (2006.01) | |
| *C12N 15/63* | (2006.01) | |
| *C12N 15/67* | (2006.01) | |
| *C12N 15/85* | (2006.01) | |
| *A61K 45/06* | (2006.01) | |

(52) U.S. Cl.
CPC ............ *A61K 35/12* (2013.01); *C12N 15/635* (2013.01); *C12N 15/67* (2013.01); *C12N 15/85* (2013.01); *A61K 45/06* (2013.01)

(58) Field of Classification Search
CPC ...... A61K 35/12; A61K 45/06; C12N 15/635; C12N 15/67; C12N 15/85
See application file for complete search history.

(56) References Cited

U.S. PATENT DOCUMENTS

| | | | |
|---|---|---|---|
| 4,997,913 A | 3/1991 | Hellstrom et al. | |
| 5,618,790 A | 4/1997 | Kennedy et al. | |
| 7,396,910 B2 | 7/2008 | Bevan et al. | |
| 8,034,332 B2 | 10/2011 | Klingemann | |
| 8,241,623 B1 | 8/2012 | Bermudes | |
| 2003/0138419 A1 | 7/2003 | Radic et al. | |
| 2008/0267978 A1 | 10/2008 | Zutter | |
| 2011/0027186 A1 | 2/2011 | Hong et al. | |
| 2015/0374790 A1 | 12/2015 | Liu et al. | |
| 2017/0183654 A1 | 6/2017 | Wong et al. | |
| 2020/0017881 A1* | 1/2020 | Xie | A61K 35/761 |
| 2020/0087680 A1* | 3/2020 | Niazi | A61K 9/0014 |

FOREIGN PATENT DOCUMENTS

| | | | | |
|---|---|---|---|---|
| WO | WO-0138566 A2 * | 5/2001 | ......... | A61K 38/1709 |
| WO | 2003047526 A3 | 11/2003 | | |
| WO | 2006/008484 A3 | 9/2006 | | |
| WO | 2006/110091 A1 | 10/2006 | | |
| WO | 2008/077945 A3 | 11/2008 | | |
| WO | 2010/021822 A3 | 6/2010 | | |
| WO | 2015/069770 A1 | 5/2015 | | |
| WO | WO-2015188191 A1 * | 12/2015 | ......... | A61K 39/0011 |
| WO | 2017/066256 A4 | 7/2017 | | |
| WO | 2017/205810 A8 | 1/2018 | | |
| WO | 2018/089637 A4 | 7/2018 | | |

OTHER PUBLICATIONS

Weinberg, Benjamin H., et al. "Large-scale design of robust genetic circuits with multiple inputs and outputs for mammalian cells." Nature biotechnology 35.5 (2017): 453-462. (Year: 2017).*

Chen, Yvonne Y., Michael C. Jensen, and Christina D. Smolke. "Genetic control of mammalian T-cell proliferation with synthetic RNA regulatory systems." Proceedings of the National Academy of Sciences 107.19: 8531-8536. (Year: 2010).*

Weinberg et al., "Large-scale design of robust genetic circuits with multiple inputs and outputs for mammalian cells", Nature Biotechnology, May 2017, vol. 35, No. 5, pp. 12 pages (Cited from Specification).

Sharif et al., "Cell density regulates cancer metastasis via the Hippo pathway", Future Oncology, 2015, vol. 11, No. 24, pp. 3253-3260 (Cited from Specification).

Bagley et al., "The structural and functional basis of cytokine receptor activation: lessons from the common beta subunit of the granulocyte-macrophage colony-stimulating factor, interleukin-3 (IL-3), and IL-5 receptors", Blood, Mar. 1, 1997, vol. 89, No. 5, pp. 1471-1482 (Cited from Specification).

Palomino et al., "Chemokines and immunity", Einstein, 2015, vol. 13, No. 3, pp. 469-473 (Cited from Specification).

Damaghi et al., "pH sensing and regulation in cancer", Frontiers in Physiology, Dec. 2013, vol. 4, No. 370, pp. 1-10 (Cited from Specification).

Blad et al., "G protein-coupled receptors for energy metabolites as new therapeutic targets", Nature reviews, Drug discovery, vol. 11, Aug. 2012, pp. 603-619 (Cited from Specification).

Yuan et al., "Nutrient sensing, metabolism, and cell growth control", Mol Cell, Feb. 7, 2013, vol. 49, No. 3, 16 pages (Cited from Specification).

Tkach et al., "Communication by Extracellular Vesicles: Where We Are and Where We Need to Go", Cell, Mar. 10, 2016, vol. 164, pp. 1226-1232 (Cited from Specification).

Ghazarian et al., "A glycobiology review: carbohydrates, lectins and implications in cancer therapeutics", Acta Histochem., May 2011, vol. 113, No. 3, 26 pages (Cited from Specification).

(Continued)

*Primary Examiner* — Maria Marvich
(74) *Attorney, Agent, or Firm* — Umberg Zipser LLP; Martin Fessenmaier; Priti Phukan

(57) ABSTRACT

The present disclosure relates to recombinant therapeutic cells comprising recombinant sensor proteins, such that a therapeutic molecule is expressed after the occurrence of two separate triggering events that are sensed by the sensor proteins. Nucleic acids, kits, and methods for making and using the recombinant therapeutic cells are also disclosed herein.

3 Claims, 4 Drawing Sheets

(56) References Cited

OTHER PUBLICATIONS

Manson et al., "Biomarkers associated with checkpoint inhibitors", Annals of Oncology, 2016, 29 pages (Cited from Specification).
Nishida et al., "Angiogenesis in Cancer", Vascular Health Risk Management , 2006, vol. 2, No. 3, pp. 213-219 (Cited from Specification).
Ward et al., "Biomarkers of apoptosis", British Journal of Cancer, 2008, vol. 99, pp. 841-846 (Cited from Specification).
Milisav Irina, "Cellular Stress Responses (10)", Institute of Pathophysiology, Faculty of Medicine, 2011, pp. 215-232 (Cited from Specification).
Akira et al., "Pathogen recognition and innate immunity", Cell, Feb. 24, 2006, vol. 124, pp. 783-801 (Cited from Specification).
Zhu et al., "How Do Cells Sense Oxygen?", Science, Apr. 20, 2001, vol. 292, No. 5516, 3 pages (Cited from Specification).
Moqrich et al., "Impaired thermosensation in mice lacking TRPV3, a heat and camphor sensor in the skin", Science, Mar. 4, 2005, vol. 307, pp. 1468-1472 (Cited from Specification).
Oakes et al., "CRISPR-Cas9 Circular Permutants as Programmable Scaffolds for Genome Modification", Cell, Jan. 10, 2019, vol. 176, No. 1-2, 35 pages (Cited from Specification).
Najafi et al., "The Mechanisms of Radiation-Induced Bystander Effect", Journal of Biomedical Physics and Engineering, 2014, vol. 4, No. 4, pp. 163-172 (Cited from Specification).
Harmsen et al., "Properties, production, and applications of camelid single-domain antibody fragments", Applied Microbiology and Biotechnology, 2007, vol. 77, pp. 13-22 (Cited from Specification).
Green et al., "Molecular Cloning A Laboratory Manual (Fourth Edition)", Cold Spring Harbor Laboratory, 2012, 34 pages (Cited from Specification).

\* cited by examiner

CONDITIONAL MODULATION OF THERAPY USING RECOMBINANT CELLS

RELATED APPLICATIONS

This application claims priority to our copending US provisional patent application with the Ser. No. 62/819,113, which was filed Mar. 15, 2019, and which is incorporated by reference herein.

FIELD OF THE INVENTION

The field of the invention is recombinant therapeutic cells for sensing one or more conditions, e.g., in the tumor microenvironment, such that a therapeutic molecule is expressed after the conditions are sensed by the cell.

BACKGROUND

The background description includes information that may be useful in understanding the present invention. It is not an admission that any of the information provided herein is prior art or relevant to the presently claimed invention, or that any publication specifically or implicitly referenced is prior art.

All publications herein are incorporated by reference to the same extent as if each individual publication or patent application were specifically and individually indicated to be incorporated by reference. Where a definition or use of a term in an incorporated reference is inconsistent or contrary to the definition of that term provided herein, the definition of that term provided herein applies and the definition of that term in the reference does not apply.

With the advent of personalized therapy for cancers, cancer treatment can be customized to a patient's needs based on genetic and other factors. Nonetheless, many cancer treatments have undesirable side effects due to killing of normal tissues.

Thus, there remains a need for compositions and methods to treat tumors in a specific and rational-designed manner.

SUMMARY OF THE INVENTION

The instant technology generally relates to recombinant therapeutic cells comprising a genetic-based (e.g., DNA, RNA, etc.) logic gate such that expression of a therapeutic agent by the cells is activated or repressed by the presence of two or more triggering events. In some embodiments, the logic gate is an AND, NOR, OR, XOR, NAND, XNOR, or other types of logic gates that operate on two or more signals and generate outputs as a function of the signals, where the expression of one or more therapeutic sequences is regulated by the occurrence of two or more separate triggering events (e.g., conditions in a tumor microenvironment). Nucleic acids, kits, and methods for making and using the recombinant therapeutic cells are also disclosed.

Although Weinberg, et al. (*Nature Biotechnology* 35, pages 453-462 (2017) and WO 2015/188191 to Wong et al. titled "DNA Recombinase Circuits for Logical Control of Gene Expression" filed Jun. 8, 2015; each incorporated herein by reference in its entirety) provides a design for genetic circuits having multiple inputs and outputs in mammalian cells, their design relies on recombinases and is not a reversible system suitable for therapeutic use. That is, once the cells containing the genetic circuits are exposed to the recombinase(s), the relevant DNA pieces are excised or inverted, and this cannot be undone.

In contrast, the recombinant therapeutic cells described herein allow for expression of the therapeutic gene to be turned on or off, depending on the microenvironment experienced by the cell at a given time. Thus, the technology described herein provides a dynamic therapeutic system utilizing genetic circuits to monitor the therapeutic cell's microenvironment and provide real-time feedback via expression of a therapeutic. For example, the expression of one or more therapeutic molecules may be turned on and/or off as the microenvironment changes (e.g., when the cell is no longer in the presence of tumor cells).

The recombinant therapeutic cells comprise genetically modified cells comprising logic cassettes, such that the presence or absence of at least two signals (e.g., from one or more triggering events) results in activation or repression of expression from a therapeutic gene. In this way, the recombinant therapeutic cells identify a set of conditions, for example in a cellular microenvironment in a patient, and modulate expression of a therapeutic agent based on the presence (or absence) of those conditions. In some embodiments, the therapeutic cells sense one or more conditions in an environment, such as a tumor microenvironment.

A particular condition, referred to herein as a "triggering event," results in a signal (e.g., presence or binding of a ligand, absence, threshold, state of a ligand, etc.). The state of a ligand includes, for example and without limitation, the presence of the ligand, absence of the ligand, ability of the ligand to bind a binding molecule (e.g., based on post-translational modification of the ligand and/or binding molecule), amount/concentration of the ligand, or other aspects of sensing one or more ligands directly or indirectly, etc.

In some embodiments, the therapeutic cell expresses at least two recombinant proteins, each of which senses a distinct triggering event by binding the signal (e.g., ligand, protein pathway activation or deactivation, etc.), and is thereby activated by the signal. The activated recombinant proteins activate expression of an expressible sequence, such as a therapeutic agent, when both recombinant proteins are present and activated. If one or no recombinant protein is activated, the expressible sequence is not expressed. This system allows expression of, for example, a therapeutic protein only when the sensor cell is in the presence of a particular type of cellular (e.g., tumor) microenvironment.

In some embodiments, the therapeutic cell expresses the expressible sequence, e.g. therapeutic agent, and this expression is repressed when both recombinant proteins are present and/or activated. If one or zero recombinant proteins is present and/or activated, the expressible sequence is expressed. This system allows expression of, for example, a therapeutic protein only when the therapeutic cell is not in the presence of a particular type of cellular microenvironment.

In some embodiments, the therapeutic cell expresses at least two recombinant proteins, each of which senses a distinct triggering event by binding the signal (e.g., ligand), and is thereby activated by the signal. The activated recombinant proteins activate expression of an expressible sequence, such as a therapeutic agent, when one or both recombinant proteins are present and activated. If no recombinant protein is activated, the expressible sequence is not expressed. This system allows expression of, for example, a therapeutic protein only when the sensor cell is in the presence of a particular type of cellular (e.g., tumor) microenvironment.

In some embodiments, the therapeutic cell expresses the expressible sequence, e.g. therapeutic agent, and this expression is repressed when one or both recombinant proteins are present and/or activated. If no recombinant protein is present and/or activated, the expressible sequence is expressed. This system allows expression of, for example, a therapeutic protein only when the therapeutic cell is not in the presence of a particular type of cellular microenvironment.

Activation of either or both recombinant protein(s) may be by, e.g., and without limitation, activation of expression of the recombinant protein(s) (transcriptionally or translationally), post-translational modification, de-repressing expression of the recombinant protein(s), etc. Repression of either or both recombinant protein(s) may be by, e.g., and without limitation, repression of expression of the recombinant protein(s) (transcriptionally or translationally), post-translational modification, de-activating expression of the recombinant protein(s), etc.

DETAILED DESCRIPTION

Figure 1:
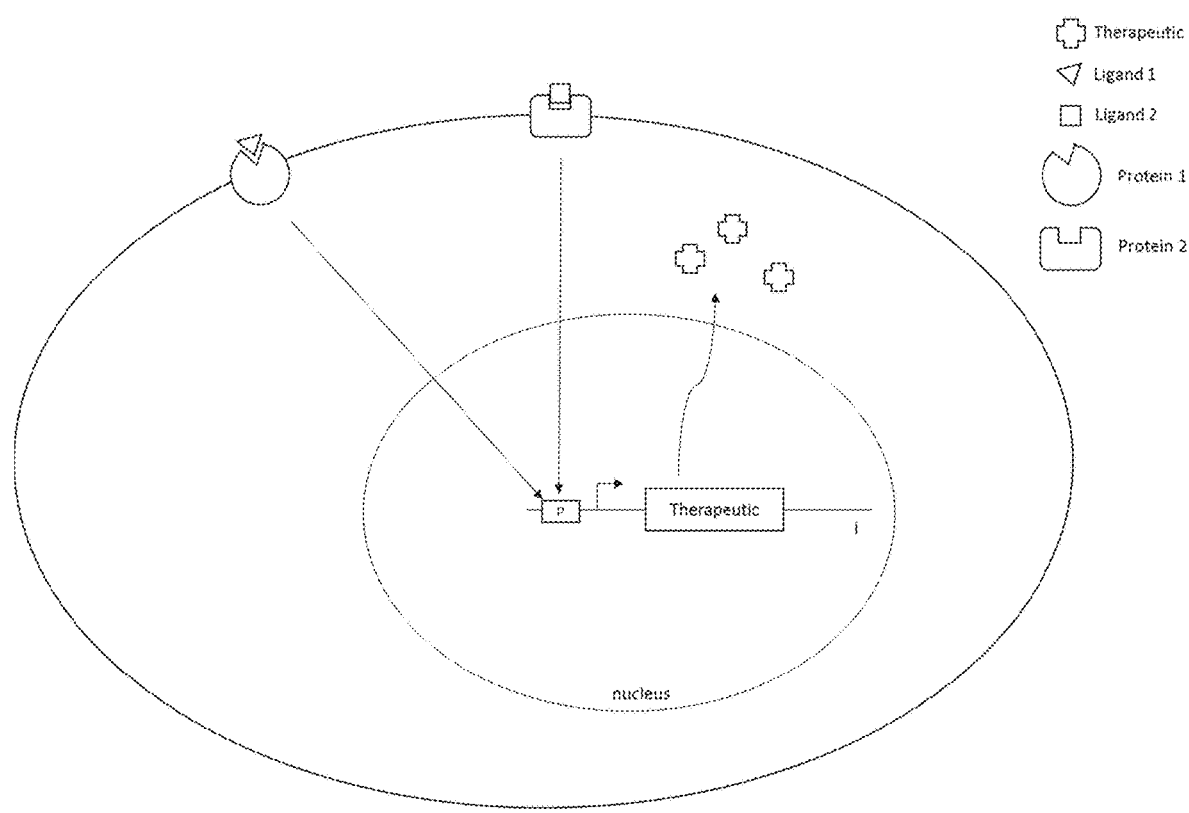
FIG. 1 is an exemplary schematic of one recombinant therapeutic cell as described herein.

After reading this description it will become apparent to one skilled in the art how to implement the invention in various alternative embodiments and alternative applications. However, all the various embodiments of the present invention will not be described herein. It will be understood that the embodiments presented here are presented by way of an example only, and not limitation. As such, this detailed description of various alternative embodiments should not be construed to limit the scope or breadth of the present invention as set forth below.

Before the present invention is disclosed and described, it is to be understood that the aspects described below are not limited to specific compositions, methods of preparing such compositions, or uses thereof as such may, of course, vary. It is also to be understood that the terminology used herein is for the purpose of describing particular aspects only and is not intended to be limiting.

The detailed description of the invention is divided into various sections only for the reader's convenience and disclosure found in any section may be combined with that in another section. Titles or subtitles may be used in the specification for the convenience of a reader, which are not intended to influence the scope of the present invention.

Definitions

Unless defined otherwise, all technical and scientific terms used herein have the same meaning as commonly understood by one of ordinary skill in the art to which this invention belongs. In this specification and in the claims that follow, reference will be made to a number of terms that shall be defined to have the following meanings:

The terminology used herein is for the purpose of describing particular embodiments only and is not intended to be limiting of the invention. As used herein, the singular forms "a", "an" and "the" are intended to include the plural forms as well, unless the context clearly indicates otherwise.

"Optional" or "optionally" means that the subsequently described event or circumstance can or cannot occur, and that the description includes instances where the event or circumstance occurs and instances where it does not.

The term "about" when used before a numerical designation, e.g., temperature, time, amount, concentration, and such other, including a range, indicates approximations which may vary by (+) or (−) 10%, 5%, 1%, or any subrange or sub-value there between. Preferably, the term "about" when used with regard to a dose amount means that the dose may vary by +/−10%.

"Comprising" or "comprises" is intended to mean that the compositions and methods include the recited elements, but not excluding others. "Consisting essentially of" when used to define compositions and methods, shall mean excluding other elements of any essential significance to the combination for the stated purpose. Thus, a composition consisting essentially of the elements as defined herein would not exclude other materials or steps that do not materially affect the basic and novel characteristic(s) of the claimed invention. "Consisting of" shall mean excluding more than trace elements of other ingredients and substantial method steps. Embodiments defined by each of these transition terms are within the scope of this invention.

As used herein, the phrase "at least one of A and B" is intended to refer to 'A' and/or 'B', regardless of the nature of 'A' and 'B'. For example, in some embodiments, 'A' may be single distinct species, while in other embodiments 'A' may represent a single species within a genus that is denoted 'A'. Likewise, in some embodiments, 'B' may be single distinct species, while in other embodiments 'B' may represent a single species within a genus that is denoted 'B'.

The terms "disease" or "condition" refer to a state of being or health status of a patient or subject capable of being treated with the compounds or methods provided herein. The disease may be a cancer. The disease may be an autoimmune disease. The disease may be an inflammatory disease. The disease may be an infectious disease. In some further instances, "cancer" refers to human cancers and carcinomas, sarcomas, adenocarcinomas, lymphomas, leukemias, etc., including solid and lymphoid cancers, kidney, breast, lung, bladder, colon, ovarian, prostate, pancreas, stomach, brain, head and neck, skin, uterine, testicular, glioma, esophagus, and liver cancer, including hepatocarcinoma, lymphoma, including B-acute lymphoblastic lymphoma, non-Hodgkin's lymphomas (e.g., Burkitt's, Small Cell, and Large Cell lymphomas), Hodgkin's lymphoma, leukemia (including AML, ALL, and CML), or multiple myeloma.

As used herein, the term "cancer" refers to all types of cancer, neoplasm or malignant tumors found in mammals (e.g. humans), including leukemias, lymphomas, carcinomas and sarcomas. Exemplary cancers that may be treated with a compound or method provided herein include brain cancer, glioma, glioblastoma, neuroblastoma, prostate cancer, colorectal cancer, pancreatic cancer, Medulloblastoma, melanoma, cervical cancer, gastric cancer, ovarian cancer, lung cancer, cancer of the head, Hodgkin's Disease, and Non-Hodgkin's Lymphomas. Exemplary cancers that may be treated with a compound or method provided herein include cancer of the thyroid, endocrine system, brain, breast, cervix, colon, head & neck, liver, kidney, lung, ovary, pancreas, rectum, stomach, and uterus. Additional examples include, thyroid carcinoma, cholangiocarcinoma, pancreatic adenocarcinoma, skin cutaneous melanoma, colon adenocarcinoma, rectum adenocarcinoma, stomach adenocarcinoma, esophageal carcinoma, head and neck squamous cell carcinoma, breast invasive carcinoma, lung adenocarcinoma, lung squamous cell carcinoma, non-small cell lung carcinoma, mesothelioma, multiple myeloma, neuroblastoma, glioma, glioblastoma multiforme, ovarian cancer, rhabdomyosarcoma, primary thrombocytosis, primary macroglobulinemia, primary brain tumors, malignant pancreatic insulanoma, malignant carcinoid, urinary bladder cancer, premalignant skin lesions, testicular cancer, thyroid cancer, neuroblastoma, esophageal cancer, genitourinary tract cancer, malignant hypercalcemia, endometrial cancer, adrenal cortical cancer, neoplasms of the endocrine or exocrine pancreas, medullary thyroid cancer, medullary thyroid carcinoma, melanoma, colorectal cancer, papillary thyroid cancer, hepatocellular carcinoma, or prostate cancer.

The terms "treating", or "treatment" refers to any indicia of success in the therapy or amelioration of an injury, disease, pathology or condition, including any objective or subjective parameter such as abatement; remission; diminishing of symptoms or making the injury, pathology or condition more tolerable to the patient; slowing in the rate of degeneration or decline; making the final point of degeneration less debilitating; improving a patient's physical or mental well-being. The treatment or amelioration of symptoms can be based on objective or subjective parameters; including the results of a physical examination, neuropsychiatric exams, and/or a psychiatric evaluation. The term "treating" and conjugations thereof, may include prevention of an injury, pathology, condition, or disease. In embodiments, treating is preventing. In embodiments, treating does not include preventing.

"Patient" or "subject in need thereof" refers to a living organism suffering from or prone to a disease or condition that can be treated by administration of a pharmaceutical composition as provided herein. Non-limiting examples include humans, other mammals, bovines, rats, mice, dogs, monkeys, goat, sheep, cows, deer, and other non-mammalian animals. In some embodiments, a patient is human.

As used herein, the term "administering" means oral administration, administration as a suppository, topical contact, intravenous, parenteral, intraperitoneal, intramuscular, intralesional, intrathecal, intranasal or subcutaneous administration, or the implantation of a slow-release device, e.g., a mini-osmotic pump, to a subject. Administration is by any route, including parenteral and transmucosal (e.g., buccal, sublingual, palatal, gingival, nasal, vaginal, rectal, or transdermal). Parenteral administration includes, e.g., intravenous, intramuscular, intra-arteriole, intradermal, subcutaneous, intraperitoneal, intraventricular, and intracranial. The term "administering" refers to direct administration (e.g., by a qualified clinician, such as a doctor or a nurse), as well as indirect administration (such as making available for administration, formulating, instructing, or reconstituting a composition).

A "cell" as used herein, refers to a cell carrying out metabolic or other function sufficient to preserve or replicate its genomic DNA. A cell can be identified by well-known methods in the art including, for example, presence of an intact membrane, staining by a particular dye, ability to produce progeny or, in the case of a gamete, ability to combine with a second gamete to produce a viable offspring. Cells may include prokaryotic and eukaroytic cells. Prokaryotic cells include but are not limited to bacteria. Eukaryotic cells include but are not limited to yeast cells and cells derived from plants and animals, for example mammalian, insect (e.g., *spodoptera*) and human cells. Cells may be useful when they are naturally nonadherent or have been treated not to adhere to surfaces, for example by trypsinization. The term "cell" also may refer to an exosome or enucleated cell that contains sufficient intracellular machinery to carry out transcription and translation.

"Contacting" is used in accordance with its plain ordinary meaning and refers to the process of allowing at least two distinct species (e.g. chemical compounds including biomolecules or cells) to become sufficiently proximal to react, interact or physically touch.

The term "expression" includes any step involved in the production of the polypeptide including, but not limited to, transcription, post-transcriptional modification, translation, post-translational modification, and secretion.

A recombinant nucleic acid sequence as described herein that encodes a sensor protein may also be referred to as a "sensor cassette."

A recombinant nucleic acid sequence as described herein that encodes a therapeutic molecule and is responsive one or more triggering events may also be referred to as a "logic cassette."

Recombinant Therapeutic Cells

The present disclosure relates to recombinant therapeutic cells, and populations of cells and/or cell lines comprising a plurality of the recombinant therapeutic cells. The recombinant therapeutic cells "sense" the presence (or absence) or other state of one or more molecules from a cellular microenvironment, and the presence (or absence) or other state of the one or more molecules causes the expression (or repression) of a therapeutic molecule. For example, the recombinant therapeutic cells may express recombinant proteins that bind to one or more molecules in a tumor microenvironment, and binding of the molecule(s) by the recombinant proteins then activates (directly or indirectly) the expression of a therapeutic molecule that treats that tumor. Alternatively, the presence of molecules that are expected to be outside of the tumor environment may result in inactivation (repression) of the therapeutic molecule by the recombinant protein(s). In preferred embodiments, two or more conditions of the microenvironment are sensed by the recombinant proteins in the recombinant therapeutic cells such that both (or at least two) need to be present (or absent) to either activate or repress expression of the therapeutic molecule. The recombinant proteins can activate or repress the expression of the therapeutic molecule directly (e.g., as a transcription factor or co-factor), or indirectly (e.g., through a signaling event, or by activation of another protein that activates/represses expression). The conditions or states of the microenvironment may also be sensed directly (e.g., binding to a molecule from the microenvironment) or indirectly (e.g., by a signaling event started by a molecule or other condition in the microenvironment). In some embodiments, turning off expression of a therapeutic molecule can include causing cell death of the recombinant therapeutic cell. The embodiments provided herein are not intended to be limiting, and one of skill in the art could envision additional embodiments of recombinant therapeutic cells that would sense at least two conditions of a cellular microenvironment and turn on or off expression of a therapeutic molecule in response to those conditions. For example, the therapeutic molecule may be turned on to provide target specificity (e.g., a second signal for tumor hypoxia is used to distinguish over working muscle tissue with low $pO_2$, etc.); and/or the therapeutic molecule may be turned off to limit the life span of the cells or to avoid off-target activity.

In some embodiments, the recombinant therapeutic cell is capable of sensing at least two triggering events, for example molecules present in a tumor microenvironment, via recombinant proteins expressed by the cell. The recombinant proteins may bind a ligand or other signal that results from the presence/occurrence of the triggering event. Once the cell senses both (or more) of the triggering events, an expressible sequence is expressed by the cell. In some embodiments, the expressible sequence encodes a therapeutic agent (e.g., mRNA or protein) that treats a disease or condition suffered by the patient. Thus, presence of the at least two triggering events results in expression or suppression of expression of a therapeutic agent to treat a disease or condition.

In non-limiting examples, the conditions to be sensed may be pH and presence of a particular cytokine; pH and hypoxia (e.g., presence of an activated HIF protein); hypoxia and presence of a particular cytokine; etc. Conditions to be sensed may be any combination of two (or more) conditions as disclosed herein. See Table 1 for a non-limiting list of example conditions that may be sensed by recombinant protein(s).

In some embodiments, the present disclosure relates to a recombinant therapeutic cell comprising: (i) a first recombinant nucleic acid (a "logic cassette") comprising a therapeutic sequence portion ("expressible sequence") encoding a therapeutic molecule; (ii) a second recombinant nucleic acid sequence comprising a first sensor sequence portion encoding a first sensor protein comprising a first sensor moiety coupled to a first effector moiety, wherein the first sensor moiety binds a first trigger molecule from a first triggering event, and further wherein the first effector moiety, upon binding the first trigger molecule, modulates expression of the therapeutic molecule (a first "sensor cassette"); and (iii) a third recombinant nucleic acid sequence comprising a second sensor sequence encoding a second sensor protein comprising a second receptor moiety coupled to a second effector moiety, wherein the second receptor moiety binds a second trigger molecule from a second triggering event (a second "sensor cassette"). In an embodiment, the therapeutic molecule is expressed only when the first effector moiety binds the first trigger molecule and the second effector moiety binds the second trigger molecule. In an embodiment, when the first trigger molecule and/or the second trigger molecule is no longer present (e.g., no longer bind to the effector moieties), the therapeutic molecule is not expressed.

In some embodiments, the present disclosure relates to a recombinant therapeutic cell comprising: (i) a first recombinant nucleic acid (a "logic cassette") comprising a therapeutic sequence portion ("expressible sequence") encoding a therapeutic molecule; (ii) a second recombinant nucleic acid sequence comprising a first sensor sequence portion encoding a first sensor protein comprising a first sensor moiety coupled to a first effector moiety, wherein the first sensor moiety binds a first trigger molecule from a first triggering event (a first "sensor cassette"); and (iii) a third recombinant nucleic acid sequence comprising a second sensor sequence encoding a second sensor protein comprising a second receptor moiety coupled to a second effector moiety (a second "sensor cassette"), wherein the second receptor moiety binds a second trigger molecule from a second triggering event, and further wherein the second effector moiety, upon binding the second trigger molecule, (a) represses expression of the therapeutic molecule; (b) represses expression of the first sensor sequence; and/or (c) triggers death of the recombinant therapeutic cell.

In an embodiment, the first sensor protein activates expression of the therapeutic molecule upon binding the first trigger molecule. In an embodiment, the first sensor protein represses expression of the therapeutic molecule upon binding the first trigger molecule.

In an embodiment, the sensor protein is under control of a tissue-specific promoter. In an embodiment, the sensor protein is inducible by an external agent (e.g., metal ions with metal response elements).

In some embodiments, the present disclosure relates to a recombinant therapeutic cell comprising: (i) a first recombinant nucleic acid (a "logic cassette") comprising a therapeutic sequence portion ("expressible sequence") encoding a therapeutic molecule; (ii) a second recombinant nucleic acid sequence comprising a first sensor sequence portion encoding a first sensor protein comprising a first sensor moiety coupled to a first effector moiety, wherein the first sensor moiety binds a first trigger molecule from a first triggering event (a first "sensor cassette"); and (iii) a third recombinant nucleic acid sequence comprising a second sensor sequence encoding a second sensor protein comprising a second receptor moiety coupled to a second effector moiety, wherein the second receptor moiety binds a second trigger molecule from a second triggering event (a second "sensor cassette"). In an embodiment, the first effector moiety activates expression of the second sensor protein, such that the second sensor protein is not expressed until the first triggering event occurs.

In an embodiment, the second effector moiety activates expression of the therapeutic molecule upon binding of the second trigger molecule. In an embodiment, the first effector moiety activates expression of the therapeutic molecule upon binding of the first trigger molecule.

In an embodiment, the second effector moiety, upon binding of the second trigger molecule, (a) represses expression of the therapeutic molecule; (b) represses expression of the first sensor sequence; and/or (c) triggers death of the recombinant therapeutic cell.

In an embodiment, the therapeutic molecule is not expressed when the cell is outside a tumor microenvironment.

In an embodiment, the first effector moiety portion comprises a chromatin remodeler, a histone acetyltransferase, a histone deacetylase, a kinase, a methylase, a transcription factor, or a transcription co-factor. In an embodiment, the second effector moiety comprises a chromatin remodeler, a histone acetyltransferase, a histone deacetylase, a kinase, a methylase, a transcription factor, or a transcription co-factor.

In an embodiment, the recombinant therapeutic cell further comprises a fourth recombinant nucleic acid sequence encoding a recombinase and operably linked to a first promoter sequence, wherein the first promoter sequence is activated by the first triggering event. In an embodiment, the third recombinant nucleic acid sequence comprises a repressor region flanked by two recognition sites for the recombinase, such that the second sensor protein is not expressed when the repressor region is present.

In some embodiments, the recombinant therapeutic cell does not comprise a recombinase. In some embodiments, the recombinant therapeutic cell does not comprise a nucleic acid encoding a recombinase.

In an embodiment, the site of interest is a tumor microenvironment.

In an embodiment, binding of the first trigger molecule results in ligand binding, phosphorylation, ubiquitination, hydrolysis, nitration, sulfhydration, acetylation, lipid modification, methylation, glycosylation, propionylation, butyrylation, succinylation, malonylation, palmitoylation, and/or crotonylation of the first sensor moiety. In an embodiment, binding of the second trigger molecule results in ligand binding, phosphorylation, ubiquitination, hydrolysis, nitration, sulfhydration, acetylation, lipid modification, methylation, glycosylation, propionylation, butyrylation, succinylation, malonylation, palmitoylation, and/or crotonylation of the second sensor moiety.

In an embodiment, the first recombinant nucleic acid further comprises a second promoter sequence operably linked to the therapeutic sequence portion. In an embodiment, the first sensor protein and/or second sensor protein activates a transcription factor or transcription co-factor that binds at the second promoter sequence.

In an embodiment, the first trigger molecule and/or the second trigger molecule is present in a tumor cell microenvironment. In an embodiment, the first trigger molecule and the second trigger molecule are present in a tumor cell microenvironment.

In an embodiment, the recombinant therapeutic cell is selected from an immune cell, a stem cell, a bacterial cell, a yeast cell, or a parasite. In an embodiment, the immune cell is a T cell, B cell, natural killer (NK) cell, or dendritic cell. In an embodiment, the immune cell is a CAR-T cell. In an embodiment, the immune cell is a NK cell. In an embodiment, the NK cell is a NK-92 cell (see U.S. Pat. No. 8,034,332 to Klingemann titled "Interleukin-secreting natural killer cell lines and methods of use", filed Jun. 6, 2003). In an embodiment, the stem cell is an embryonic stem cell, adipose stem cell, mesenchymal stem cell, hematopoietic stem cell, neural stem cell, or induced pluripotent stem cell.

In an embodiment, the recombinant therapeutic cell is an autologous cell. In an embodiment, the recombinant therapeutic cell is an allogeneic cell. In an embodiment, the recombinant therapeutic cell has been cultured (grown and/or proliferated) in vitro. In an embodiment, the recombinant therapeutic cell is a HLA-compatible donor cell. In an embodiment, the recombinant therapeutic cell is from the same species as the patient. In an embodiment, the recombinant therapeutic cell is an HLA-engineered cell.

In an embodiment, the first sensor protein or second sensor protein triggers death of the recombinant therapeutic cell by repression of interleukin 2 (IL-2) and/or pro-apoptotic signal expression by the recombinant therapeutic cell.

In an embodiment, the first triggering event is selected from cell density, pH, hypoxia, heat, presence of a molecule of interest, or concentration of a molecule of interest. In an embodiment, the molecule of interest is a cytokine, a chemokine, a metabolite, an exosome, an enzyme, a sugar, an intracellular component, a soluble checkpoint inhibitor, a signaling factor, a virus, a yeast cell, or a bacterial cell. In an embodiment, the molecule of interest is a triggering molecule listed in Table 1. In an embodiment, the molecule of interest is a ligand for a sensor protein listed in Table 1.

In an embodiment, the second triggering event is selected from cell density, pH, hypoxia, heat, presence of a molecule of interest, or concentration of a molecule of interest. In an embodiment, the molecule of interest is a cytokine, a chemokine, a metabolite, an exosome, an enzyme, a sugar, an intracellular component, a soluble checkpoint inhibitor, a signaling factor, a virus, a yeast cell, or a bacterial cell. In an embodiment, the molecule of interest is a triggering molecule listed in Table 1. In an embodiment, the molecule of interest is a ligand for a sensor protein listed in Table 1. Preferably, the first triggering event and second triggering event are distinct events.

In an embodiment, the cell does not contain a nucleic acid having a therapeutic sequence portion encoding a therapeutic molecule. For example, the cell may be the therapeutic agent (e.g., as in adoptive cell therapy) and the triggering event results in turning off expression of an endogenous protein that is important for the therapeutic function of the cell, and/or the triggering event results in death of the cell (e.g., apoptosis).

In an embodiment, the therapeutic molecule is a chimeric antigen receptor (CAR). In an embodiment, the therapeutic molecule is an anti-cancer therapy. In an embodiment, the therapeutic molecule is selected from a pro-apoptotic protein, a therapeutic antibody (or portion thereof), a chimeric antigen receptor, an antisense RNA, an immune stimulating cytokine, a chemokine, a cytotoxic protein, an immunostimulating protein, a suicide gene, and a sodium iodide symporter (NIS).

In embodiments, the first triggering event is the concentration of a molecule in the tumor microenvironment. In embodiments, the presence of a low concentration of the molecule causes low level of expression of the therapeutic molecule. In embodiments, the presence of a high concentration of the molecule causes a high level of expression of the therapeutic molecule. In some embodiments, the presence of a high concentration of the molecule causes low level of expression of the therapeutic molecule. In some embodiments, the presence of a low concentration of the molecule causes a high level of expression of the therapeutic molecule. In some embodiments, the presence of a high concentration of the molecule turns on expression of the therapeutic molecule. In some embodiments, the presence of a high concentration of the molecule turns off expression of the therapeutic molecule. In some embodiments, the presence of a low concentration of the molecule turns on expression of the therapeutic molecule. In some embodiments, the presence of a low concentration of the molecule turns off expression of the therapeutic molecule.

In an embodiment, the second sensor protein induces apoptosis of the cell upon binding the second trigger molecule.

In an embodiment, the first and/or second triggering event is external to the recombinant therapeutic cell. In an embodiment, the first and/or second triggering event is internal to the recombinant therapeutic cell.

In some embodiments, the present disclosure relates to a recombinant therapeutic cell comprising: (i) a first recombinant nucleic acid (a "logic cassette") comprising a therapeutic sequence portion ("expressible sequence") encoding a therapeutic molecule; and (ii) a second recombinant nucleic acid sequence comprising a first sensor sequence portion encoding a first sensor protein comprising a first sensor moiety coupled to a first effector moiety, wherein the first sensor moiety binds a first trigger molecule from a first triggering event (a "sensor cassette"), and further wherein the first sensor protein, upon binding the first trigger molecule, modulates strength of expression of the therapeutic molecule.

In an embodiment, the first sensor protein is a transcription factor or transcription co-factor. In an embodiment, the first sensor protein is a transcriptional activator or transcriptional co-activator that up-regulates expression of the therapeutic molecule. In an embodiment, the first sensor protein is a transcriptional repressor or transcriptional co-repressor that down-regulates expression of the therapeutic molecule. In an embodiment, the first sensor protein is a transcriptional repressor or transcriptional co-repressor that turns off expression of the therapeutic molecule.

In an embodiment, the first effector moiety is a transcription factor or transcription co-factor. In an embodiment, the first effector moiety is a transcriptional activator or transcriptional co-activator that up-regulates expression of the therapeutic molecule. In an embodiment, the first effector moiety is a transcriptional repressor or transcriptional co-repressor that down-regulates expression of the therapeutic molecule. In an embodiment, the first effector moiety is a transcriptional repressor or transcriptional co-repressor that turns off expression of the therapeutic molecule.

In an embodiment, the recombinant therapeutic cell further comprises: (iii) a third recombinant nucleic acid sequence comprising a second sensor sequence encoding a second sensor protein comprising a second receptor moiety coupled to a second effector moiety, wherein the second receptor moiety binds a second trigger molecule from a second triggering event, and further wherein the second sensor protein, upon binding the second trigger molecule, (a) represses expression of the therapeutic molecule; (b) represses expression of the first sensor sequence; and/or (c) triggers death of the recombinant therapeutic cell. In an embodiment, the second triggering event is present in the tumor microenvironment. In an embodiment, the second triggering event is present in a region outside the tumor microenvironment.

In an embodiment, the first recombinant nucleic acid further comprises a first promoter sequence operably linked to the therapeutic sequence portion. In an embodiment, the first sensor protein and/or second protein molecule binds to the first promoter sequence.

In an embodiment, the first triggering event is selected from cell density, pH, hypoxia, radio signal, MRI, heat, presence of a molecule of interest, or concentration of a molecule of interest. In an embodiment, the second triggering event is selected from cell density, pH, hypoxia, radio signal, MRI, heat, presence of a molecule of interest, or concentration of a molecule of interest.

In an embodiment, the molecule of interest is a cytokine, a chemokine, a metabolite, an exosome, an enzyme, a sugar, an intracellular component, a soluble checkpoint inhibitor, a signaling factor, a virus fragment (i.e., a whole virus or a part thereof), a yeast cell fragment, or a bacterial cell fragment.

In an embodiment is provided a recombinant cell line comprising a plurality of recombinant therapeutic cells as described herein.

Although many of the logic cassettes described herein are AND gates, one of skill in the art would understand that logic cassettes comprising other types of logic gates are covered by the present invention. The logic cassette may comprise any type of logic gate that is turned on or off by at least two conditions, such as and without limitation, AND, NAND, OR, NOR, XOR, XNOR gates or combination of logical gates that produce more complex functions (e.g., adders, counters, multiplexers, etc.). See, e.g., Weinberg et al, *Nature Biotechnology* 35, pages 453-462 (2017), and U.S. Patent Pub. No. 2017/0183654, each of which is incorporated herein by reference in its entirety.

In one embodiment, the logic cassette comprises a NAND gate. In one embodiment, the recombinant therapeutic cell comprises a first sensor cassette and a second sensor cassette, such that each sensor cassette is responsive (e.g., transcriptionally, translationally, or activation/repression of the activity of a protein expressed therefrom) to a different triggering event, and a logic cassette comprising a nucleic acid sequence comprising a promoter operably linked to an expressible sequence, wherein the expressible sequence is expressed in the absence of the triggering events and is repressed only when both triggering events occur. For example, the sensor cassettes may express transcriptional repressors or co-repressors in response to the triggering events, and the transcriptional repressors repress the promoter of the logic cassette; the sensor cassettes may express transcriptional activators that are repressed by the triggering events; etc. In one embodiment, more than two triggering events may be required, such that expression of the expressible sequence is repressed only when all triggering events occur.

In one embodiment, the logic cassette comprises a NOR gate. In one embodiment, the presence of either (or both) of two conditions (i.e., triggering events) will repress expression of the expressible sequence. In one embodiment, more than two triggering events may be used, such that expression of the expressible sequence is repressed when one or more of the triggering events occur.

In one embodiment, the logic cassette comprises an OR gate. In one embodiment, the presence of either (or both) of two conditions (i.e., triggering events) will activate expression of the expressible sequence. In one embodiment, more than two triggering events may be used, such that expression of the expressible sequence is activated when one or more of the triggering events occur.

In one embodiment, the logic cassette comprises an XOR gate. In one embodiment, the presence of either of two conditions (i.e., triggering events), but not both, will activate expression of the expressible sequence. In one embodiment, more than two triggering events may be used, such that expression of the expressible sequence is activated when only one, only two, etc., but not all, of the triggering events occur.

In one embodiment, the logic cassette comprises an XNOR gate. In one embodiment, the presence of either of two conditions (i.e., triggering events), but not both, will repress expression of the expressible sequence. In one embodiment, more than two triggering events may be used, such that expression of the expressible sequence is repressed when only one, only two, etc., but not all, of the triggering events occur.

In some embodiments, the recombinant therapeutic cell comprises one or more additional sensor cassettes, each expressing an additional sensor protein that senses an additional triggering event. In some embodiments, the expressible sequence is only expressed when the additional triggering event(s) occur.

In some embodiments is provided a cell line comprising a plurality of recombinant therapeutic cells as described herein.

FIG. 1 is a schematic of one embodiment of a recombinant therapeutic cell as described herein. Protein 1 and Protein 2 are expressed from the first and second sensor cassettes (i.e., the second and third recombinant nucleic acid sequences), respectively (not shown). Ligand 1 is a signal from a first triggering event, and Ligand 2 is a signal from a second triggering event. Upon binding of Ligand 1 to Protein 1, Protein 1 initiates a signal that results in binding of a transcriptional activator or transcriptional co-activator (or removal of a transcriptional repressor) at the promoter (P) of the logic cassette (i). However, transcription from P is not initiated until Ligand 2 binds to Protein 2, resulting in a second signal that results in binding of a second transcriptional activator or transcriptional co-activator (or removal of a second transcriptional repressor) at the promoter (P) of the logic cassette (i). The logic cassette (i) encodes an expressible gene (e.g., encoding a therapeutic molecule) that is expressed upon transcription from the promoter (P).

Although Protein 1 and Protein 2 are depicted in FIG. 1 as membrane-bound proteins, one of skill in the art would understand that one or both proteins may be intracellular proteins, e.g. proteins that sense a signal from a triggering event indirectly (e.g., via a signal cascade through endogenous cell protein(s) that are activated by the triggering event) or directly (e.g., by binding a ligand from the signaling event, wherein the ligand is capable of active or passive diffusion into the cell).

For example, and without limitation, a recombinant therapeutic cell as described herein may comprise a first recombinant nucleic acid sequence encoding a therapeutic molecule, a second recombinant nucleic acid sequence comprising a gene encoding an IL-8 receptor (e.g., CXCR1 or CXCR2) operatively linked to a constitutive promoter, a third recombinant nucleic acid sequence comprising a gene encoding hypoxia inducible factor alpha (HIFa) operatively linked to a constitutive promoter, the first recombinant nucleic acid sequence comprising a promoter that is activated only when activated HIFa and a down-stream effector of the IL-8 receptor (e.g., a transcription factor activated by the IL-8 pathway). When the recombinant therapeutic cell is in an environment where both IL-8 and hypoxia are present, e.g., a tumor microenvironment, the therapeutic molecule is expressed. In contrast, when only one of hypoxia or IL-8 is present, e.g., hypoxia in a muscle tissue, the therapeutic molecule gene is not expressed. In some embodiments, a reporter, e.g., green fluorescent protein or other reporter molecule, is expressed from the first recombinant nucleic acid sequence (or from a different logic cassette that is activated in the same manner as the first) alternatively or in addition to a therapeutic molecule. Such reporter is especially suitable to identify specific sensed conditions within a disease environment that may be indicative of likely treatment success or failure.

Figure 2:
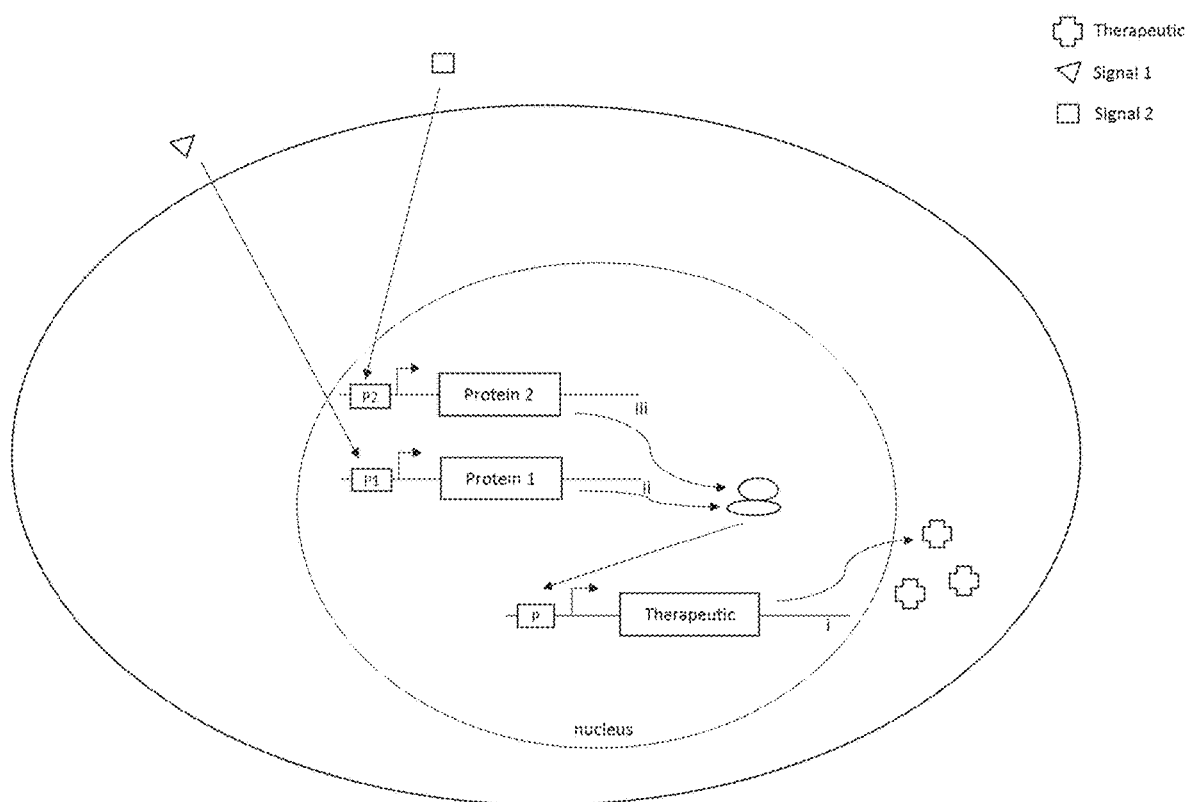
FIG. 2 is an exemplary schematic of another recombinant therapeutic cell as described herein.

FIG. 2 is a schematic of another embodiment of a recombinant therapeutic cell as described herein. The presence of Ligand 1 results in activation of expression of Protein 1 from promoter 1 (P1) in the first sensor cassette (ii). The presence of Ligand 2 results in activation of expression of Protein 2 from promoter 2 (P2) in the second sensor cassette (iii). Protein 1 and Protein 2 interact, e.g., via linkers on each protein (e.g., leucine zipper, nanobody/peptide, streptavidin/strep-tag, or an affinity clamp), to form a single activator protein that activates transcription of the therapeutic agent (i).

Sensed Environments

The sensed environment may be any environment of interest, e.g. to a clinician. In some embodiments, the first triggering event and/or the second triggering event is present in a tumor cell microenvironment. In some embodiments, the first triggering event and/or the second triggering event is present in a microenvironment characterized by the presence of fatty tissue or acne. In some embodiments, the first triggering event and/or the second triggering event is present in (e.g., characteristic of) a particular tissue, for example and without limitation prostate, liver, lung, breast, brain, skin, blood, hair follicles, heart, bladder, uterus, cervix, ovary, colon, etc. In some embodiments, the sensed environment is an inflamed tissue. In some embodiments, the sensed environment is a healthy tissue. In some embodiments, the sensed environment is an infected tissue. In some embodiments, the sensed environment is an inflamed tissue.

In some embodiments, the first triggering event is selected from cell density, cell stress, pH, hypoxia, heat, presence of a molecule of interest, or concentration of a molecule of interest. In some embodiments, the second triggering event is selected from cell density, cell stress, pH, hypoxia, heat, presence of a molecule of interest, or concentration of a molecule of interest. In some embodiments, the first triggering event or the second triggering event is the presence of intracellular components (histones, ribosomal proteins, necrosis proteins, etc.) in the intercellular/extracellular environment. In some embodiments, the first or second triggering event is an event that stimulates growth of a cell (e.g., vascularization, presence of VEGF, etc.). In some embodiments, the first or second triggering event is an event that indicates apoptosis, cell stress, necrosis, or loss of cell adhesion.

In some embodiments, the first triggering event is an externally-caused event, for example an event caused by a clinician. In some embodiments, the second triggering event is an externally-caused event, for example an event caused by a clinician. Events caused by a clinician may include, without limitation, administration of radiation, a drug, and/or heat to the subject. The drug may be any molecule that can be administered to the subject (by any route) that causes a recombinant protein in the recombinant therapeutic cell to activate or repress expression of the therapeutic molecule. Non-limiting examples include anti-cancer drugs, antibodies, small molecules, and the like.

In some embodiments, the molecule of interest is a cytokine, a chemokine, a metabolite, an exosome, an enzyme, a sugar, an intracellular component, a soluble checkpoint inhibitor, a signaling factor, a pathogen (e.g., a virus, a yeast cell, or a bacterial cell).

Triggering Events/Conditions and Recombinant Proteins

Molecules that indicate various triggering events are known in the art, as are proteins that sense those molecules. Non-limiting examples are provided in Table 1.

| Triggering Event | Triggering Molecule(s) | Sensor Protein(s) | References* |
|---|---|---|---|
| cell density | other cells in proximity | Hippo pathway, YAP, TAZ, GPCRs, e-cadherin | Sharif et al., *Future Oncol*. 2015 Dec.; 11(24): 3253-3260; US20110027186; WO2003047526 |
| cytokines | cytokine (e.g., chemokines, interferons, interleukins, lymphokines, and tumour necrosis factors) | cytokine receptors | Bagley et al., *Blood* 1997 89: 1471-1482, WO2006110091. |
| chemokines | chemokines (e.g., CXC, CX3C, CC, or C chemokines) | chemokine receptors (e.g., CXC chemokine receptors, CC chemokine receptors, CX3C chemokine receptors and XC chemokine receptors) | Palomino and Marti, *Einstein* (Sao Paulo) 2015 Jul.-Sep.; 13(3): 469-473. |

-continued

| Triggering Event | Triggering Molecule(s) | Sensor Protein(s) | References* |
|---|---|---|---|
| pH | proton (H+) | acid-sensing ion channels (ASICs) and proton-sensing GPCRs (e.g., GPR4, GPR132, TDAG8, and OGR1); pH-sensitive conjugates | Damaghi et al., Front. Physiol. 2013 Vol. 4, Article 370; U.S. Pat. No. 4,997,913. |
| metabolites | metabolite (e.g., alcohol, amino acids, nucleotides, antioxidants, organic acids, polyols, vitamins, fatty acids, saccharides, lactate, ketone) | receptors (e.g., GPCRs) | Blad et al., *Nature Reviews Drug Discovery* volume 11, pages 603-619 (2012); Yuan et al., Mol Cell. 2013 Feb. 7; 49(3): 379-387. |
| exosomes and other extracellular vesicles | exosomes, microvesicles, ectosomes, microparticles, surface molecules | receptors | Tkach and Thery, *Cell* 164, March 10, 2016, 1226-1232. |
| sugars | sugar or sugar moiety | lectins, sucrose transporters, glucosensors | Ghazarian, et al., *Acta Histochem.* 2011 May; 113(3): 236-247. |
| Soluble immune checkpoint markers | PD-L1, PD-L2 | PD1, CTLA4 | Manson et al., *Annals of Oncology*, Volume 27, Issue 7, 1 Jul. 2016, Pages 1199-1206; WO2015069770. |
| angiogenic factors | VEGF, bFGF, TGF-α, TGF-β, platelet-derived endothelial growth factor, granulocyte colony-stimulating factor, placental growth factor, interleukin-8, hepatocyte growth factor, epidermal growth factor | receptors for each factor (e.g., VEGFR, TGFR, EGFR, IL receptors, etc.) | Nishida et al., *Vasc Health Risk Manag.* 2006 Sep.; 2(3): 213-219; US20080267978. |
| tumor-specific factors | neoepitopes; tumor-associated antigens | antibodies, CARs | WO2017205810; WO2017066256; WO2018089637 |
| apoptosis | apoptosis-associated factors (e.g., cleaved cytokeratin-18 (c-CK18), cleaved caspase-3 (c-cas-3), cleaved lamin A (c-lam-A), phosphorylated histone H2AX (gammaH2AX), cleaved poly(ADP ribose) polymerase (c-PARP), phosphatidylserine, Cytokeratins, Nucleosomal DNA, Apo-1/Fas, Fas ligand (sFasL), Bcl-2/Bcl-xl/Mcl-1, p53, phospo-p53, p21wafi, pH2AX, cytochrome c, Activated caspases 2, 3, 7, 8 and 9, fortilin) | receptors, antibodies | Ward et al., *British Journal of Cancer* volume 99, pages 841-846 (16 Sep. 2008); US20030138419; WO2010021822. |
| stress | stress proteins, cytokines, chemokines, apoptotic factors, etc. | receptors, etc. | Milisav (2011). Cellular Stress Responses, *Adv. in Regen. Med.*, S. Wislet-Gendebien (Ed.); WO2006008484. |
| loss of adhesion | cell adhesion molecules (CAMs, e.g., integrins, immunoglobulin (Ig) superfamily, cadherins, and selectins) | CAMs | |
| pathogens | pathogen (bacterial cell, fungus, virus, parasite, etc) or an antigen or toxin therefrom | receptors (e.g., TLRs), antibodies, lectins, fusion proteins | Akira et al. *Cell* 124, 783-801, Feb. 24, 2006. |
| hypoxia | intracellular oxygen levels | HIFα, HIFβ, heme protein, prolyl hydroxylase | Zhu and Bunn, *Science.* 2001 Apr. 20; |

| Triggering Event | Triggering Molecule(s) | Sensor Protein(s) | References* |
|---|---|---|---|
| heat/temperature | heat | vanilloid receptor; thermo-sensing transient receptor potential subfamily (thermoTRP) | 292(5516): 449-451. U.S. Pat. No. 7,396,910; Moqrich et al., *Science* 04 Mar 2005: Vol. 307, Issue 5714, pp. 1468-1472 |

*Each reference is incorporated herein by reference in its entirety.

In some embodiments, the proteins that sense a triggering molecule and/or activate expression are fusion proteins, for example having a sensor (e.g., ligand-biding) domain from one protein and an effector domain (e.g., activator domain or repressor domain) from a different protein. In some embodiments, the same protein senses (e.g., binds) the trigger molecule and activates or represses transcription, e.g., of the expressible sequence. In some embodiments, the sensor protein modulates activity of another protein that in turn modulates transcription, e.g., of the expressible sequence. The protein that is modulated by the sensor protein may be an endogenous protein, or it may be a recombinant protein.

In some embodiments, the molecule of interest in a cytokine. Cytokines include, but are not limited to, IL-1, IL-2, IL-6, IL-8, IL-10, IL-12, IL-15, IL-21, IL-23, TNFα, TGFβ, IFN-gamma, M-CSF, GM-CSF, MIF, FAS, or FAS ligand. In some embodiments, the molecule of interest in a chemokine. Chemokines include, but are not limited to, CCL2, CXCL12, CXCL8, CXCL1, CXCL2, CXCL3, CXCL8, CXCL13, CXCL14, CCL5, CCL17, and CCL22.

In embodiments, the molecule of interest is IL-15. In embodiments, the therapeutic molecule is IL-15. In embodiments, the IL-15 is ALT-803 (Altor Bioscience). See, e.g., US20150374790, which is incorporated herein by reference in its entirety.

In embodiments, the triggering event is the presence of a protease. For example, a sensor protein includes a protease-sensitive region such that the sensor protein is in an inactive state in the absence of the protease. The presence of the protease results in cleavage of the protease-sensitive region and activation of the sensor protein. Alternatively, the sensor protein includes a protease-sensitive region such that the sensor protein is in an active state in the absence of the protease. The presence of the protease results in cleavage of the protease-sensitive region and inactivation of the sensor protein. The protease may be any protease, for example a protease that is up-regulated in a cancer cell. Protease-sensitive proteins and modifications are known, for example as described in Oakes et al., 2019, *Cell* 176, 254-267; U.S. Pat. Nos. 8,241,623; 5,618,790; each of which is incorporated herein by reference in its entirety.

In some embodiments, the sensor protein is a chimeric antigen receptor (CAR) or similar to a CAR. That is, the ligand-binding domain of the sensor comprises an antibody (or fragment thereof) to the trigger molecule, and the effector domain comprises a signaling molecule that results in repression or activation of the expressible sequence upon binding of the trigger molecule to the antibody (or fragment thereof).

In some embodiments, the sensor protein is a receptor that is not normally expressed by the recombinant therapeutic protein.

In some embodiments, the triggering event is irradiation of a tumor. Irradiation of a tumor causes bystander effects, where non-irradiated cells near the irradiated cells are affected by signals from the irradiated tumor. Irradiation of a tumor can also cause abscopal effects, i.e., effects in a site that is distant from the tumor. The triggering molecule may be a molecule that results from irradiation or bystander effect, for example and without limitation, cytokines (e.g., IL-1, IL-2, IL-6, IL-8, IL-12, IL-15, IL-21, TNFα, TGFβ), cyclooxygenase-2, miRNA (e.g., miR-29, miR-17, MIR-29a and MIR-29b), siRNA and piRNA. See, *J Biomed Phys Eng.* 2014 December; 4 (4): 163-172, which is incorporated herein by reference in its entirety.

Of course, it should be recognized that a triggering molecule may be a molecule as indicated above, or may be a down-stream effector of such a molecule.

Expressible Sequences

In an embodiment, the therapeutic molecule is a chimeric antigen receptor (CAR). In an embodiment, the therapeutic molecule is an anti-cancer therapy. In an embodiment, the therapeutic molecule is selected from a pro-apoptotic protein, a therapeutic antibody, a chimeric antigen receptor, an antisense RNA, an immune stimulating cytokine, a chemokine, a cytotoxic protein, an immunostimulating protein, a suicide gene, a sodium iodide symporter (NIS), a cytotoxic pathway molecule, and an immunorepressor. In some embodiments, the therapeutic molecule is a perforin or granzyme. In some embodiments, the therapeutic molecule is a pro-inflammatory cytokine (e.g., IL-8, TGF-β) or other molecule to reduce immune suppression.

In some embodiments, the expressible sequence further encodes a binding peptide linked to the therapeutic molecule. For example, an antibody, ligand for a protein of interest (e.g., a cell surface protein expressed by a tumor cell), or other binding peptide may be linked to (fused with) a therapeutic molecule. In some embodiments, the binding peptide recognizes (binds to) an epitope that is present in a particular microenvironment (e.g., tumor microenvironment). In some embodiments, expression of the binding peptide linked to a therapeutic molecule allows targeting of the therapeutic molecule to a particular cell or cell type (e.g., cancer cell). In some embodiments, the antibody is a single domain antibody (e.g., camelid antibody) or epitope-binding fragment thereof. Single domain antibodies are known in the art, for example as described in Harmsen and Haard, *Appl Microbiol Biotechnol.* 2007 November; 77 (1): 13-22 and WO2008077945, each of which is incorporated herein by reference in its entirety.

In some embodiments, a reporter is expressed in addition to the therapeutic molecule. The reporter may be expressed from the same recombinant nucleic acid sequence as the therapeutic molecule, or may be expressed from a different recombinant nucleic acid sequence that is activated (or repressed) in the same way as the recombinant nucleic acid sequence that encodes the therapeutic molecule. In some embodiments, the reporter may be any reporter protein or RNA that can be detected in vivo, ex vivo, or in vitro. In some embodiments, the reporter is selected from a fluorescent protein, a cell surface marker, a detectable RNA molecule, a detectable DNA molecule, a luciferase, or a reporter enzyme. Such reporters are well known in the art. In some embodiments, the reporter can be detected by imaging the cell (e.g., within a patient or in vitro). In some embodiments, the reporter can be detected in a biological sample. In some embodiments, the reporter can be detected in a liquid biopsy (e.g., blood sample), biopsy, urine, fecal sample, mucous, or other bodily fluid.

In some embodiments, the expressible sequence further encodes a cell surface marker to allow isolation of the cell from a sample, e.g. a biological sample, e.g., blood.

Vectors

Any type of vector may be used, including, without limitation, viruses, yeast, organelles, plasmids, and the like. In some embodiments, the nucleic acids (e.g., the first, second and/or third nucleic acids) are present on one or more vectors in the cell. In some embodiments, one, two, three or more of the nucleic acids is present in a single vector.

In some embodiments is provided a recombinant vector comprising one or more of: (i) a first recombinant nucleic acid comprising a therapeutic sequence portion encoding a therapeutic molecule; (ii) a second recombinant nucleic acid sequence comprising a first sensor sequence portion encoding a first sensor protein comprising a first sensor moiety coupled to a first effector moiety, wherein the first sensor moiety binds a first trigger molecule from a first triggering event, and further wherein the first effector moiety, upon binding the first trigger molecule, modulates expression of the therapeutic molecule; and (iii) a third recombinant nucleic acid sequence comprising a second sensor sequence encoding a second sensor protein comprising a second receptor moiety coupled to a second effector moiety, wherein the second receptor moiety binds a second trigger molecule from a second triggering event; wherein the therapeutic molecule is expressed only when the first effector moiety binds the first trigger molecule and the second effector moiety binds the second trigger molecule Type of Cells In some embodiments, the recombinant therapeutic cell is an immune cell, a stem cell, a bacterial cell, or a parasite. In some embodiments, the immune cell is an immunocompetent cell. In some embodiments, the immune cell is a natural killer cell, a B cell, or a T cell. In some embodiments, the cell is derived from a subject, e.g., a patient to be treated.

In some embodiments, the bacterial cell is *Escherichia coli*. In some embodiments, the bacterial cell does not trigger the endotoxic response in mammalian cells. In some embodiments, the bacterial cell is a ClearColi® cell (Lucigen®, Madison, WI).

In some embodiments, the parasite is a nematode, a spirochete, or a fungus.

In some embodiments, the recombinant therapeutic cell is an enucleated cell that is capable of transcription and translation. In some embodiments, the recombinant therapeutic cell is an exosome that is capable of transcription and translation.

The present disclosure also relates, in part, to methods of making recombinant therapeutic cells as described herein. Methods of inserting recombinant nucleic acids into cells are well known in the art. See, e.g., M. R. Green and J. Sambrook, Molecular Cloning: A Laboratory Manual (Fourth Edition), Cold Spring Harbor Laboratory Press; (Jun. 15, 2012).

In some embodiments, the nucleic acids are transiently transfected into the cell. In some embodiments, the nucleic acids are stably transfected into the cell. In some embodiments, the nucleic acids are stably transfected into the cell. In embodiments, the nucleic acids are introduced into the cell as a plasmid. In embodiments, the nucleic acids are introduced into the cell as an artificial chromosome. In embodiments, the nucleic acids are introduced into the cell using a viral vector. In embodiments, the nucleic acids are inserted into the cell by homologous recombination, e.g., into a chromosome of the cell. In embodiments, the nucleic acids are inserted into the cell by non-homologous end joining.

In some embodiments, the nucleic acids are inserted into the cell, e.g., the genome of a cell, using a gene editing reagent. Gene editing reagents include, without limitation, RNA-guided nuclease (e.g., CRISPR system, CRISPR/Cas9, CRISPR/cpf1, etc.); meganuclease, zinc finger nuclease (ZFN), or transcription activator-like effector-based nuclease (TALEN).

In some embodiments is provided a method for producing a recombinant therapeutic cell as described herein, the method comprising introducing the first recombinant nucleic acid sequence, second recombinant nucleic acid sequence, and third recombinant nucleic acid sequence into the cell.

Methods of Using Recombinant Therapeutic Cells

In Vivo Methods

A recombinant therapeutic cell as described herein may be engineered for treatment of a cancer by expressing an anti-tumor therapy, which therapy is turned on or off by the presence of a triggering event in the microenvironment around the therapeutic cell, for example a tumor microenvironment. For example, the triggering event may be a molecule, e.g., a protein, that is expressed (over-expressed) by tumor cells, or a molecule that is expected to be present in the microenvironment of a particular tumor/cancer type. Alternatively, the triggering event may be a molecule, e.g., a protein, that is not expressed (under-expressed) by tumor cells, or a molecule that is not expected to be present in the microenvironment of a particular tumor/cancer type, but is expected to be expressed by non-cancer cells.

In another aspect, a recombinant therapeutic cell as described herein may be appropriate for treatment of a cancer (e.g., adoptive T cell therapy, NK cell therapy, etc.), and the therapeutic ability of the cell and/or the proliferative capacity of the cell is turned on or off, and/or cell death is initiated in the cell, by the presence of a triggering event in the microenvironment around the therapeutic cell, for example a tumor microenvironment. For example, the triggering event may be a molecule, e.g., a protein, that is expressed (over-expressed) by tumor cells, or a molecule that is expected to be present in the microenvironment of a particular tumor/cancer type. Alternatively, the triggering event may be a molecule, e.g., a protein, that is not expressed (under-expressed) by tumor cells, or a molecule that is not expected to be present in the microenvironment of a particular tumor/cancer type, but is expected to be expressed by non-cancer cells.

In an embodiment, the recombinant therapeutic cell is a natural killer (NK) cell. For example, the NK cell expresses recombinant interleukin, e.g., IL-2 (therapeutic protein). IL-2 increases resilience of the cell to hypoxic conditions and increases the life span and replication of the NK cells. The NK cell may also express a recombinant receptor that binds a molecule in the tumor microenvironment (e.g., VEGF, or other tumor-associated antigen), and turns off IL-2 expression when the molecule is no longer available for binding (i.e., when the NK cell moves outside of the tumor microenvironment).

In another embodiment, the NK cell expresses a CAR (instead of or in addition to the IL-2) and binding of the molecule to the receptor turns the CAR on (in the tumor microenvironment) and/or off (outside the tumor microenvironment).

In an embodiment, the recombinant therapeutic cell is a CAR-T cell, expressing a CAR (therapeutic molecule). The CAR-T cell may express a receptor that binds a molecule in the tumor microenvironment (e.g., VEGF, or other tumor-associated antigen) and turns on expression of the CAR when the cell is in the tumor microenvironment. The binding of the receptor by the molecule (or a different molecule in the tumor microenvironment) may also arm a "kill switch," such that a second event (e.g., moving outside the tumor microenvironment or the presence of an exogenous molecule) causes programmed cell death of the CAR-T cell.

In an embodiment, the recombinant therapeutic cell is a stem cell that expresses a recombinant therapeutic protein for treatment of a cancer. The stem cell may express a receptor that binds a molecule in the tumor microenvironment (e.g., VEGF, or other tumor-associated antigen) and turns on expression of the therapeutic protein when the cell is in the tumor microenvironment.

A recombinant therapeutic cell as described herein may be administered to a subject. As would be apparent to a person of skill in the art, the mode of administration may differ, depending on the disease to be treated, the subject, the area or tissue to be treated, etc. In some embodiments is provided a composition comprising a recombinant therapeutic cell as described herein which is formulated for topical, subcutaneous, micro needle array, intravenous, oral, nasal, vaginal, or anal delivery.

In some embodiments is provided a topical composition comprising a recombinant therapeutic cell as described herein. In some embodiments is provided an injectable composition comprising a recombinant therapeutic cell as described herein. In some embodiments, the injectable composition is formulated for intravenous administration. In some embodiments is provided an oral composition comprising a recombinant therapeutic cell as described herein.

In some embodiments is provided a method of treating cancer in a patient in need thereof, the method comprising contacting the tumor microenvironment with a recombinant therapeutic cell as described herein, thereby treating the cancer. Treating the cancer includes, without limitation, reducing the size of a tumor, reducing metastasis of the tumor, limiting growth of a tumor, etc.

In some embodiments is provided a method of treating a tumor, the method comprising contacting the tumor microenvironment with a recombinant therapeutic cell as described herein, wherein the first recombinant nucleic acid sequence encodes a therapeutic molecule that treats the tumor. In some embodiments, the molecule that treats the tumor is an immune stimulating cytokine, a chemokine, a pro-apoptotic protein, an antisense RNA, a chimeric antigen receptor, or a therapeutic antibody.

In some embodiments, the tumor is in a subject and the recombinant therapeutic cell is derived from the subject.

By way of example only, and without limitation, a recombinant therapeutic cell as described herein may be used to treat a tumor in a patient by sensing at least two triggering events in a tumor microenvironment. Upon sensing the events, a therapeutic molecule is expressed that treats the tumor. In some embodiments, a plurality of recombinant therapeutic cells can be administered to the patient. A topical formulation comprising the recombinant therapeutic cell could be used, for example, to treat melanoma on the skin of a patient.

Kits

In some aspects, this disclosure relates to a kit comprising one or more components for making and/or using the recombinant therapeutic cells described herein. In an embodiment, the kit comprises one or more vectors encoding recombinant proteins as described herein. In an embodiment, the kit comprises one or more vectors encoding therapeutic proteins as described herein. In an embodiment, the kit comprises cells that can be used to make the recombinant therapeutic cells as described herein.

In some embodiments is provided a kit comprising at least one of:
 (i) a therapeutic sequence portion encoding a therapeutic molecule;
 (ii) a first sensor sequence portion encoding a first sensor protein comprising a first receptor moiety coupled to a first effector moiety, wherein the first receptor moiety is capable of sensing a first triggering event, and further wherein the first sensor protein, upon sensing the first triggering event, modulates expression of the therapeutic molecule; and optionally
 (iii) a second sensor sequence encoding a second sensor protein comprising a second receptor moiety coupled to a second effector moiety, wherein the second receptor moiety is capable of sensing a second triggering event, wherein the second sensor protein, upon sensing the second triggering event, (c) represses expression of the therapeutic molecule; (d) represses expression of the first sensor sequence; and/or (e) triggers death of the recombinant therapeutic cell.

Example

Figure 3:
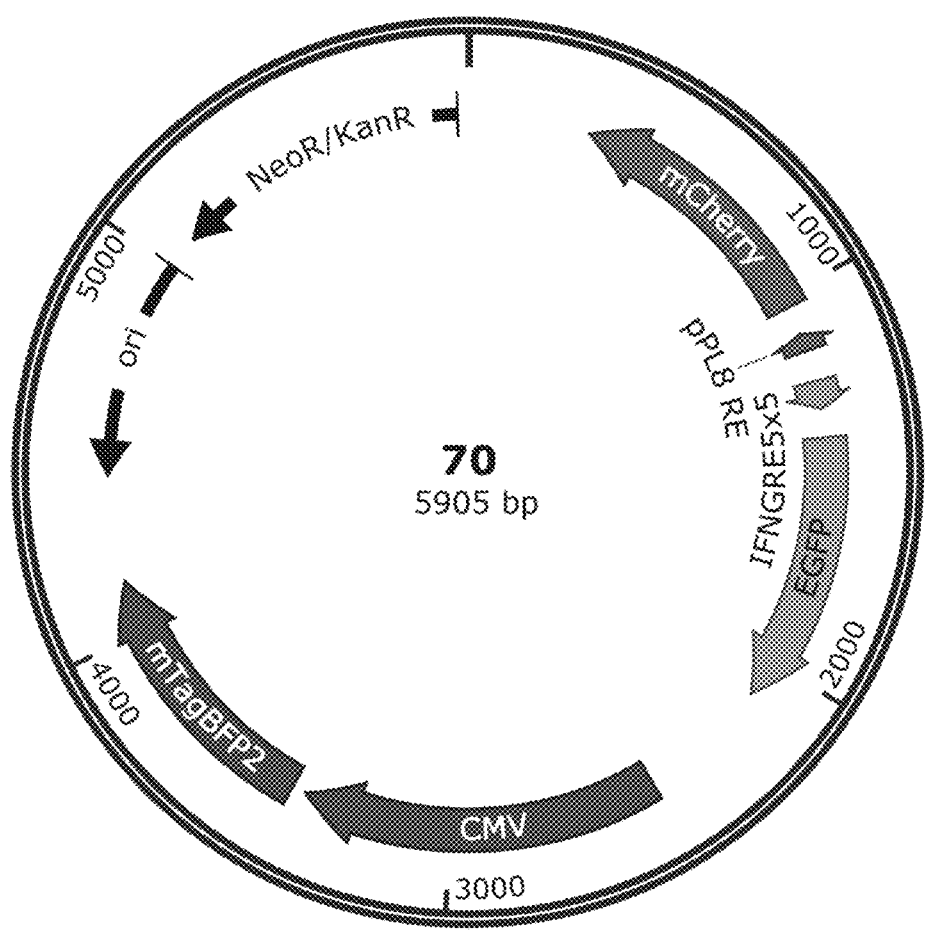
FIG. 3 is an exemplary vector map for a recombinant cell as described herein.

In one example, the inventors transfected selected mammalian cells with a plasmid construct that had a TGF-beta responsive sequence element (here: PL8RE) that was operably coupled to a sequence element encoding mCHERRY. The construct further had a IFN-gamma responsive sequence element (here: IFNGRE, pentameric) that was operably coupled to a sequence element encoding EGFP as can be seen in FIG. 3. First and second sensor proteins (here IFN-gamma receptor and TGF-beta receptor) were present in the cell modified using the recombinant DNA and encoded on the nuclear genome, and binding of the respective ligands on the outside of the recombinant cell lead to expression of mCHERRY and EGFP, respectively, which represents a model for the schematic illustration of FIG. 2. As will be readily appreciated, mCHERRY and EGFP can be readily replaced by any desirable regulator protein that may alone or in combination affect expression of another gene to so obtain a triggerable expression that is dependent on the presence and/or quantity of selected environmental factors. Likewise, it should be appreciated that while the nucleic acid encoding the sensor proteins was a genomic nucleic acid, these nucleic acids can be readily incorporated into a recombinant nucleic acid.

Figure 4:
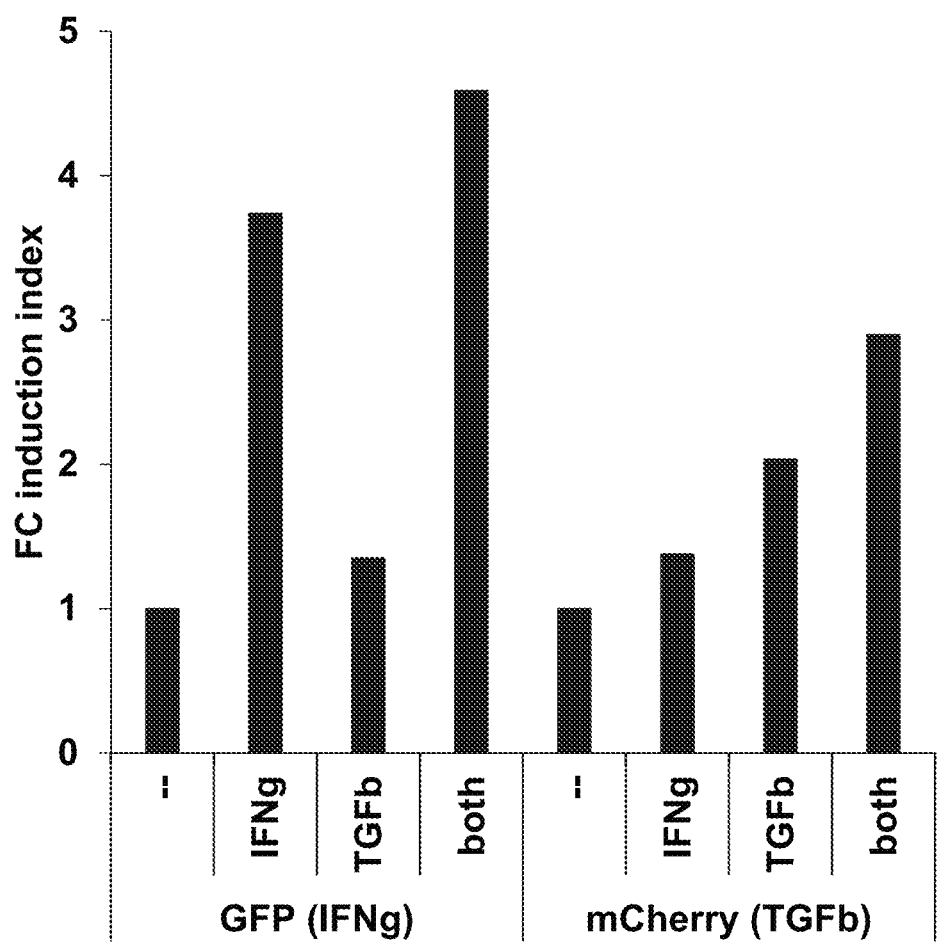
FIG. 4 depicts exemplary results for a recombinant cell transfected with a vector or FIG. 3.

Exemplary results are shown in FIG. 4 where HEK-293T cells transfected with the plasmid using Lipofecamine 2000 (Invitrogen) according to the manufacturer's recommended protocol, as shown in FIG. 3 produced no EGFP or mCherry fluorescence after overnight incubation as determined using an Attune N×T Flow cytometer (Invitrogen) in the absence of the respective sensed environmental parameter (here TGF-beta or IFN-gamma). The same cells did produce specific fluorescence in the presence of the specific sensed environmental parameter (here TGF-beta at 10 ng/ml and/or IFN-gamma at 100 ng/ml).

Viewed from a different perspective, the above example clearly demonstrate that selected environmental stimuli (here: IFG-gamma and TGF-beta) can be detected via respective receptors that may be encoded on a recombinant nucleic acid. Signal transduction via these receptors can then result in expression of specific proteins with desired function to effect expression of a therapeutic protein, repression of a specific protein, and/or cell death. In the above example, the first and second sensor proteins were encoded on the genome to produce the IFN-gamma and TGF-beta receptors. Upon activation of the receptors, recombinant nucleic acids encoding first and second effector molecules (here: simulated by mCherry and EGFP, which could be replaced, for example by any two-hybrid transactivator systems such as Gal4BD and Gal4AD, optionally with bait and prey) will then cooperate to activate expression of a therapeutic molecule (e.g., under control of aGal4 UAS promoter). As such, control over a therapeutic function can be exerted by interplay of one, at least two conditional factors that can be detected by the recombinant cell.

What is claimed is:

1. A recombinant isolated therapeutic cell comprising:
   (i) a first recombinant nucleic acid comprising a therapeutic sequence portion encoding a therapeutic molecule, wherein the first recombinant nucleic acid further comprises a first promoter sequence operably linked to the therapeutic sequence portion, wherein the therapeutic molecule is a chimeric antigen receptor (CAR); and
   (ii) a second recombinant nucleic acid sequence comprising a first sensor sequence portion encoding a first sensor protein, comprising a first sensor moiety coupled to a first effector moiety, wherein the first sensor moiety is a cytokine receptor receptive to a cytokine selected from the group consisting of IL-1, IL-2, IL-6, IL-8, IL-10, IL-12, IL-15, IL-21, IL-23, TNFα, TGFβ, IFN-gamma, M-CSF, GM-CSF, MIF, FAS, and FAS ligand, or wherein the first sensor moiety is a chemokine receptor receptive to a chemokine selected from the group consisting of CCL2, CXCL12, CXCL8, CXCL1, CXCL2, CXCL3, CXCL8, CXCL13, CXCL14, CCL5, CCL17, and CCL22,
   wherein the second recombinant nucleic acid further comprises a second promoter sequence operatively linked to the first sensor sequence portion, wherein the second promoter sequence is constitutive;
   wherein the first sensor moiety binds a first trigger molecule from a first triggering event; and
   wherein the first effector moiety is selected from the group consisting of Gal4 binding domain (Gal4BD) and Gal4 activation domain (Gal4AD).

2. The recombinant therapeutic cell of claim 1, wherein the first sensor protein regulates expression of the therapeutic molecule by upregulating a transcription factor or transcription co-factor that binds at the first promoter sequence.

3. The recombinant therapeutic cell of claim 1, wherein the first sensor protein regulates expression of the therapeutic molecule by downregulating a transcription factor or transcription co-factor that binds at the first promoter sequence.

* * * * *